United States Patent [19]
Cabane et al.

[11] Patent Number: 6,033,677
[45] Date of Patent: Mar. 7, 2000

[54] COLLOIDAL DISPERSION AND REDISPERSIBLE COMPOSITION IN THE FORM OF A CERIUM OXIDE BASED COLLOIDAL DISPERSION

[75] Inventors: Bernard Cabane; Minou Nabavi, both of Paris, France

[73] Assignee: Rhodia Chimie, Courbevoie, France

[21] Appl. No.: 08/983,001

[22] PCT Filed: Jun. 24, 1996

[86] PCT No.: PCT/FR96/00983

§ 371 Date: Apr. 13, 1998

§ 102(e) Date: Apr. 13, 1998

[87] PCT Pub. No.: WO97/02212

PCT Pub. Date: Jan. 23, 1997

[30] Foreign Application Priority Data

Jun. 30, 1995 [FR] France .................................. 95 07895

[51] Int. Cl.⁷ ..................................................... A61K 7/00
[52] U.S. Cl. ........................................... 424/401; 424/489
[58] Field of Search ...................................... 424/401, 489

[56] References Cited

U.S. PATENT DOCUMENTS 4,886,624  12/1989  Gradeff et al. .......................... 252/308

*Primary Examiner*—Michael A. Williamson
*Attorney, Agent, or Firm*—John A. Shedden; Jean-Louis Seugnet

[57] ABSTRACT

The invention relates to a colloidal dispersion, characterized in that it comprises a cerium oxide and at least one additive chosen from β-diketones, monocarboxylic acids containing a hydroxyl function in the α- or β-position and diols. It also relates to a redispersible composition in the form of a colloidal dispersion based on cerium oxide and the same above mentioned additives. The colloidal dispersion of the invention can be obtained by a process which is characterized in that at least one above mentioned additive is added to a colloidal dispersion of cerium oxide as the starting material. Finally, the invention relates to the use of a dispersion of the above type or of the type obtained by redispersing a redispersible composition, on a substrate as an anticorrosion agent, in a cosmetics composition, in catalysis, in particular for automobile post-combustion, in lubrication or in ceramics.

18 Claims, No Drawings

COLLOIDAL DISPERSION AND REDISPERSIBLE COMPOSITION IN THE FORM OF A CERIUM OXIDE BASED COLLOIDAL DISPERSION

This application is an application under 35 U.S.C. Section 371 of International Application Number PCT/FR96/00983, filed on Jun. 24, 1996.

BACKGROUND OF THE INVENTION

1. Field of the Invention

The present invention relates to a colloidal dispersion and a redispersible composition in the form of a colloidal dispersion, based on cerium oxide.

2. Description of the Related Art Including Information Disclosed under 37 C.F.R. 1.97 and 1.98

Dispersions of cerium compounds are used in numerous applications. There may be mentioned in particular use in heterogeneous catalysis and, especially, catalysis for treatment of exhaust gases from internal combustion engines (catalysis for automobile post-combustion). These dispersions can also be used as an anticorrosion coating agent or in cosmetics.

However, the use of these dispersions is limited by a certain instability over a period of time, leading to sedimentation. Furthermore, the cost of transportation of these dispersions is always increased by the fact that it is necessary to transport, in addition to the active element, the liquid phase in which this is in suspension.

As a result, it is of particular interest to be able to have available either stable dispersions or solid products which are capable of being redispersed to give a colloidal suspension.

In addition, the known processes for the preparation of these dispersions allow only suspensions having a very acid pH, that is to say generally less than 5, to be obtained.

Thus, in the applications which have been mentioned above, and in particular in the case of cosmetics, it is important to be able to have available colloidal dispersions having less acid pH values.

A first object of the invention is therefore the preparation of a stable colloidal dispersion of cerium oxide which has, in particular, a high pH.

BRIEF SUMMARY OF THE INVENTION

A second object of the invention is to obtain a solid composition based on cerium oxide, which is redispersible in the form of a colloidal dispersion.

For this purpose, the colloidal dispersion of cerium oxide in a liquid phase, according to the invention, is characterised in that it also comprises at least one additive chosen from:

β-diketones;

monocarboxylic acids containing a hydroxyl function in the α- or β-position;

diols.

The invention also relates to a redispersible composition in the form of a colloidal dispersion, characterised in that it comprises a cerium oxide and at least one additive chosen from:

β-diketones;

monocarboxylic acids containing a hydroxyl function in the α- or β-position;

diols.

The invention furthermore relates to a process for the preparation of a colloidal dispersion of cerium oxide, characterised in that at least one additive chosen from:

β-dietones;

β- monocarboxylic acids containing a hydroxyl function in the α- or β-position;

diols, is added to a colloidal dispersion of cerium oxide as the starting material.

DETAILED DESCRIPTION OF THE INVENTION

The dispersions according to the invention have the advantage in particular of being stable for at least several months up to pH values of the order of 7.5.

Other characteristics, details and advantages of the invention will also become more completely apparent on reading the description which follows, as well as the various concrete but non-limiting examples intended to illustrate the invention.

In the description which follows, the expression colloidal dispersion of a cerium compound means any system made up of fine solid particles of colloidal dimensions based on cerium oxide and/or hydrated cerium oxide (cerium hydroxide) in suspension in a liquid phase, it also being possible for the said species, where appropriate, to contain residual amounts of bonded or adsorbed ions, such as, for example, nitrate, acetate, citrate or ammonium ions. It can be seen that such dispersions can contain the cerium either totally in the form of colloidal particles or both in the form of ions and in the form of colloidal particles.

In addition, it is mentioned here that the mean diameter of the colloidal particles is to be understood as meaning the mean hydrodynamic diameter of the latter, as determined by quasi-elastic diffusion of light in accordance with the method described by Michael L. McCONNELL in the review Analytical Chemistry 53, no. 8, 1007, A, (1981).

As indicated above, the colloidal dispersion of the invention is characterised by the presence of an additive, which can first be chosen from β-diketones. These are, in particular, compounds of the formula (1)

$$R_1\text{—CO—CH}_2\text{—CO—}R_2 \quad (1)$$

in which $R_1$ and $R_2$ can be identical or different and represent a substituted or unsubstituted alkyl, alkoxy, aryl, aryloxy, aralkyl or arylalkyloxy group. At least one of $R_1$ and $R_2$ can also represent a polyalkylene ether alcohol radical.

Compounds of the formula (1) which may be mentioned in particular are those in which $R_1$ is an alkyl group, preferably methyl, and $R_2$ represents an alkyl group, more particularly identical to $R_1$, or an aryl group, in particular a phenyl group.

Compounds which may be mentioned by way of example are those of the formula $CH_3\text{—CO—CH}_2\text{—CO—CH}_3$ (acetylacetone), $CH_3\text{—CO—CH}_2\text{—CO—C}_6H_6$ (benzoylacetone) or $C_6H_5\text{—CO—CH}_2\text{—CO—C}_6H_6$. A polyalkylene ether alcohol radical $R_1$ or $R_2$ which may be mentioned by way of example is a group of the formula $BuO(CH_2\text{—}CH_2O)_n$.

According to another embodiment of the invention, the abovementioned additive can be chosen from monocarboxylic acids containing a hydroxyl function in the α- or β-position.

More particularly, phenol acids, such as, for example, salicylic acid, can be used.

According to a third embodiment of the invention, the abovementioned additive can be chosen from diols.

The abovementioned additive will be chosen as a function of its hydrophobic or hydrophilic nature, according to the type of dispersion required, in an aqueous medium or in a solvent medium.

The abovementioned additive is usually present in an amount such that the molar ratio of additive/cerium oxide varies between 0 (this value being excluded) and 5, and preferably between 0 and 1.

The mean diameter of the colloidal particles of the dispersion is generally not more than 500 nm, and preferably not more than 10 nm.

In addition, the dispersion of the invention has a pH of between 1 and 7.5, more particularly between 5 and 7.5. This is understood as meaning that the dispersion of the invention remains stable in this pH range. Outside this range, destabilization thereof may result. However, it should be noted that this possible destabilization is not irreversible. In fact, on returning to a pH within the range given above, a stable dispersion is obtained again.

The colloidal dispersion of the invention can be a dispersion either in an aqueous phase or in an organic phase. In the latter case, the organic phase is chosen from those which solubilize the abovementioned additive.

In the case of a dispersion in an organic phase, the organic solvent used can be an inert aliphatic or cycloaliphatic hydrocarbon or a mixture thereof, such as, for example, mineral oil or petroleum spirit, or mineral ether or petroleum ether, which may also contain aromatic components. Examples which may be mentioned are hexane, heptane, octane, nonane, decane, cyclohexane, cyclopentane, cycloheptane and liquid naphthenes. Aromatic solvents, such as benzene, toluene, ethylbenzene and xylenes, are also suitable, as well as petroleum cuts of the Solvesso type (trademark registered by the company EXXON), in particular Solvesso 100, which essentially comprises a mixture of methylethyl- and trimethylbenzene, and Solvesso 150, which comprises a mixture of dialkylbenzenes, in particular dimethylethylbenzene and tetramethylbenzene.

It is also possible to use chlorinated hydrocarbons, such as chloro- or dichlorobenzene and chlorotoluene, as well as aliphatic and cycloaliphatic ethers, such as diisopropyl ether and dibutyl ether, aliphatic and cycloaliphatic ketones, such as methyl isobutyl ketone, diisobutyl ketone and mesityl oxide, and phenol ketones, such as acetophenone.

Esters can also be envisaged. As esters which can be used there may be mentioned those obtained from $C_1$ to $C_8$ alcohols, and in particular the palmitates of a secondary alcohol such as isopropanol.

In the case of dispersions in an organic phase, the liquid phase may also comprise an acid or a mixture of acids, it being possible for the acid or acids to be chosen from those containing 11 to 50 carbon atoms, and preferably 15 to 25 carbon atoms, and having at least one branch in the alpha-, beta-, gamma- or delta-position of the atom which carries the acid hydrogen.

It is advantageous for the pKa of at least one of the acids to be not more than 5, preferably not more than 4.5.

It is also advantageous if the side chain(s) of the branched acids contain at least two carbon atoms, preferably three carbon atoms.

Acids which may be mentioned as examples are those containing phosphorus, such as the phosphoric acids, in particular diesters of phosphoric acid, the phosphonic acids and their monoesters and the phosphinic acids.

The acids which make up the mixture of acids known by the name isostearic acid may also be mentioned.

It may be advantageous to add to the organic phase a promoter agent, the function of which is to accelerate transfer of the colloidal particles from the aqueous phase to the organic phase during preparation of the dispersion in an organic phase, and to improve the stability of the organic dispersions obtained. Promoter agents which may be used are compounds having an alcohol function, and in particular linear or branched aliphatic alcohols having 6 to 12 carbon atoms.

Specific examples which may be mentioned are 2-ethylhexanol, decanol, dodecanol and a mixture of these.

The proportion of the said agent in the organic phase is not critical and can vary within wide limits.

However, a proportion of between 2 and 15% by weight is generally particularly suitable.

The process for the preparation of the dispersion of the invention will now be described.

A colloidal dispersion which could have been obtained by any known means is first used as the starting material. Reference may be made in particular to the processes described in European Patent Applications EP 206906, EP 208581 and EP 316205. In particular, the colloidal dispersions obtained by thermohydrolysis of an aqueous solution of a cerium(IV)⁻salt, such as a nitrate, in an acid medium in particular may be used. Such a process is described in European Patent Application EP 239477 or EP 208580.

At least one additive of the type described above is then added in the amounts described above to this starting dispersion. After addition of the additive, it is possible to heat the dispersion to accelerate the reaction.

If necessary, the pH of the dispersion thus obtained may be increased by various methods.

A first method comprises adding a base, such as, for example, sodium carbonate, to the dispersion.

Another method comprises subjecting the dispersion to a dialysis treatment. In this case, the dialysis is carried out against a solution at the desired pH using a dialysis membrane which is resistant to the pH of the dispersion and has an exclusion diameter which is impermeable to the colloidal particles. This may be, for example, a thin-walled cellulosic membrane. An advantage of this method is that it allows dispersions having a low content of anions, and more particularly of nitrate, to be obtained. Thus, by way of example, for nitrates the molar ratio of $NO_3/Ce$ in the dispersion is less than 0.7, and more particularly can be between 0.01 and 0.7, and even more particularly between 0.15 and 0.3.

The description of the process which has been given here applies to the preparation of the dispersion in an aqueous phase. For the preparation of a dispersion in an organic phase, a dispersion in an aqueous phase is first prepared in the manner indicated, and this aqueous dispersion is brought into contact with an organic phase which has the composition given above.

The water can also be removed by drying the aqueous dispersion and then returning the product obtained to the organic phase.

The dispersion of the invention also allows access to a redispersible composition in the form of a colloidal dispersion.

To obtain such a composition, the said dispersion is subjected to evaporation, centrifugation, ultrafiltration or osmotic compression.

The evaporation, centrifugation and ultrafiltration can be carried out using any suitable device.

Osmotic compression is a known method, the principle of which comprises equilibrating the chemical potential of the water through a membrane.

The procedure followed is to introduce the colloidal dispersion in a dialysis bag, for example of cellulosic material, this bag being placed in an aqueous solution, of which the chemical potential of the water differs from that of the aqueous phase of the dispersion. This can be effected, for example, using an aqueous solution of polyethylene glycol (PEG), or also dextran. The concentration of PEG or dextran determines the osmotic pressure and therefore the final concentration of the colloidal dispersion of the cerium compound.

The treatments which have been mentioned are carried out by themselves or in combination and allow a colloidal dispersion to be converted continuously into a gel or paste and then a powder. This paste or this powder can also be dried at a temperature such that the additive described above does not evaporate. The concentration of cerium may range from a value of 2 to 200 g/l in the colloidal dispersion up to a value of 700 g/kg, that is to say 1,750 g/l, in the powder or gel.

A redispersible composition in the form of a colloidal dispersion, characterised in that it comprises a cerium oxide an at least one additive chosen from β-diketones, monocarboxylic acids containing a hydroxyl function in the α- or β-position and diols, is thus obtained.

This composition can be redispersed in a liquid medium, and a colloidal dispersion identical to the colloidal dispersion of the invention described above is thus obtained.

The colloidal dispersions of the invention as described above or those of the type obtained by redispersing a redispersible composition can be used in numerous applications. There may be mentioned catalysis, in particular for automobile post-combustion, lubrication, ceramics and cosmetics, and, in this case, they can be used in the preparation of cosmetics compositions, in particular in the preparation of anti-UV creams. They can be used as an anticorrosion agent on a substrate.

Examples will now be given.

EXAMPLE 1

A colloidal dispersion of $CeO_2$ at pH 2 is used as the starting material. The size of the colloidal particles is 5 nm. The concentration is 200 g/l.

Acetylacetone is then added to the dispersion in an amount such that the molar ratio of acetylacetone/cerium is 1. A dispersion according to the invention is obtained immediately. A 10% solution of NaOH is then added such that a pH of 6.5 is obtained. This dispersion remains stable, and the size of the particles, defined by the above mentioned method, remains identical to that of the initial sol.

This dispersion is concentrated by osmotic compression. The solution used to concentrate the dispersion is made up of a 45% solution of dextran in water containing a concentration of acetylacetone of the order of 10 g/l.

When osmotic equilibrium is reached, the product is in the form of a paste having a concentration of 300 g/kg, that is to say 400 g/l.

A portion of this paste is taken and added to deionized water. It disperses spontaneously to give a dispersion identical to the initial dispersion.

The other portion of this paste is dried more completely in air in the presence of silica gel to a concentration of 1,400 g/l, that is to say 650 g/kg.

It is then redispersed in water and gives the initial dispersion.

EXAMPLE 2

0.07 g salicylic acid is added to 100 ml of a dispersion of $CeO_2$ having a concentration of oxide of 20 g/l and a size of the colloidal particles of 5 nm.

This stable dispersion is at pH 2. A portion of this dispersion is concentrated by osmotic compression as above. The powder obtained is dispersed in a nitric acid solution at pH 2.

A dispersion containing particles of cerium oxide identical to the initial particles is thus obtained.

The other portion of the dispersion is dialysed against a solution of water containing 0.7 g/l salicylic acid, the pH of which can be adjusted to between 2 and 6 with the aid of NaOH or $HNO_3$. A stable dispersion of which the pH is that of the dialysis solution is thus obtained.

The concentration of this dispersion is 20 g/l. It can be increased by evaporation of the water. A powder having a concentration of 300 g/kg, that is to say 400 g/l, is prepared in this way, and is partly redispersed in water to give a dispersion of cerium oxide at a pH of between 2 and 6, depending on the initial pH of the dispersion before drying.

EXAMPLE 3

The starting cerium oxide dispersion of example 2 is used.

20 ml are mixed with 0.4 g Rhodiastab 50® ($C_6H_5$—CO—$CH_2$—CO—$C_6H_5$). The mixture is placed in a closed bottle in an oven at 50° C. for 48 h. A stable sol is thus obtained.

The water can be removed by evaporation in an oven at 80EC. A powder is obtained, and is dispersed in 20 ml acetophenone.

A stable dispersion in an organic medium is thus obtained.

EXAMPLE 4

The procedure is as in example 3, but using 0.4 g Rhodiastab 83® ($C_6H_5$—CO—$CH_2$—CO—$CH_3$).

EXAMPLE 5

This example shows the benefit of a dispersion according to the invention in a cosmetics application.

1 g acetylacetone is added to 100 ml of a dispersion of $CeO_2$ of 20 g/l, in which the size of the colloidal particles is 5 nm. The pH of the dispersion is then brought to 6 by dialysis against an aqueous solution at pH 6.

The range of absorption of ultraviolet radiation is measured with the aid of a spectrometer. In the case of the initial dispersion, this range stops at 380 nm. In the case of the dispersion according to the invention, this range is extended to 460 nm.

We claim:

1. A colloidal dispersion of cerium oxide in a liquid phase, comprising one or more additives selected from the group consisting of β-diketones; monocarboxylic acids containing a hydroxyl function in the α- or β-position; and diols wherein the molar ratio of additive/cerium oxide is between 0 and 5 and wherein the dispersion has a pH of between 1 and 7.5.

2. A dispersion according to claim 1, wherein the additive is a compound of formula (1):

$$R_1\text{—CO—}CH_2\text{—CO—}R_2 \qquad (1)$$

wherein $R_1$ and $R_2$ can be identical or different and represent a substituted or unsubstituted alkyl, alkoxy, aryl, aryloxy, aralkyl, arylalkyloxy group, or a polyalkylene ether alcohol radical.

3. A dispersion according to claim 1, wherein the additive is a phenol acid.

4. A dispersion according to claim 1, wherein the liquid phase consists essentially of water.

5. A dispersion according to claim 1, wherein the dispersion has a pH of between 5 and 7.5.

6. A dispersion according to claim 1, wherein the liquid phase is an organic solvent.

7. A dispersion according to claim 2, wherein the molar ratio of additive/cerium oxide is between 0 and 1.

8. A process for the preparation of a colloidal dispersion of cerium oxide in a liquid phase as defined in claim 1, comprising the step of adding to the liquid phase one or more additives selected from the group consisting of β-diketones; monocarboxylic acids containing a hydroxyl function in the α- or β-position; and diols.

9. A process according to claim 8, further comprising the step of adding a base to the dispersion.

10. A process according to claim 8, further comprising the step of subjecting the dispersion to a dialysis treatment.

11. A redispersible composition in the form of a colloidal dispersion, comprising a cerium oxide in a liquid phase and one or more additives selected from the group consisting of β-diketones; monocarboxylic acids containing a hydroxyl function in the α- or β-position; and diols wherein the molar ratio of additive/cerium oxide is between 0 and 5 and wherein the dispersion has a pH of between 1 and 7.5.

12. A process for the preparation of a redispersible composition in the form of a colloidal dispersion, comprising a cerium oxide in a liquid phase and one or more additives selected from the group consisting of β-diketones; monocarboxylic acids containing a hydroxyl function in the α- or β-position; and diols wherein the molar ratio of additive/cerium oxide is between 0 and 5 and wherein the dispersion has a pH of between 1 and 7.5, said process comprising the steps of:

adding to the liquid phase one or more additives selected from the group consisting of β-diketones; monocarboxylic acids containing a hydroxyl function in the α- or β-position; and diols; and subjecting the liquid phase to evaporation, centrifugation, ultrafiltration or osmotic compression.

13. A method of using a redispersible composition according to claim 11, on a substrate as an anticorrosion agent.

14. A method of using a redispersible composition according to claim 11, in a cosmetic composition, in lubrication or in ceramics.

15. A method of using a redispersible composition according to claim 11, in catalysis for automobile post-combustion.

16. A dispersion according to claim 1, wherein the liquid phase consists essentially of an organic phase.

17. A dispersion according to claim 6, wherein the organic solvent is an aliphatic hydrocarbon, an cycloaliphatic hydrocarbon, a chlorinated hydrocarbon, an aliphatic ether, or an cycloaliphatic ether.

18. A dispersion according to claim 16, further comprising an acid.

* * * * *